(12) United States Patent
Patel et al.

(10) Patent No.: US 12,054,803 B2
(45) Date of Patent: Aug. 6, 2024

(54) DUAL PASS, DUAL ANNEAL WELDING METHOD FOR JOINING HIGH STRENGTH STEELS

(71) Applicant: ArcelorMittal, Luxembourg (LU)

(72) Inventors: Vikas Kanubhai Patel, Naperville, IL (US); Dinesh Patel, Munster, IN (US); Alan Poling, Bay Village, OH (US)

(73) Assignee: ArcelorMittal, Luxembourg (LU)

( * ) Notice: Subject to any disclaimer, the term of this patent is extended or adjusted under 35 U.S.C. 154(b) by 311 days.

(21) Appl. No.: 17/293,108

(22) PCT Filed: Nov. 19, 2018

(86) PCT No.: PCT/IB2018/059096
§ 371 (c)(1),
(2) Date: May 12, 2021

(87) PCT Pub. No.: WO2020/104832
PCT Pub. Date: May 28, 2020

(65) Prior Publication Data
US 2022/0002835 A1    Jan. 6, 2022

(51) Int. Cl.
| | |
|---|---|
| C21D 9/50 | (2006.01) |
| B23K 11/06 | (2006.01) |
| B23K 11/16 | (2006.01) |
| B23K 103/04 | (2006.01) |
| C21D 1/42 | (2006.01) |

(52) U.S. Cl.
CPC ............. *C21D 9/505* (2013.01); *B23K 11/16* (2013.01); *C21D 1/42* (2013.01); *B23K 11/06* (2013.01); *B23K 2103/04* (2018.08)

(58) Field of Classification Search
CPC .......... C21D 1/42; C21D 9/505; B23K 11/06; B23K 11/16; B23K 2103/04
See application file for complete search history.

(56) References Cited

U.S. PATENT DOCUMENTS

| | | | |
|---|---|---|---|
| 5,676,862 A | 10/1997 | Matteson et al. | |
| 8,803,023 B2* | 8/2014 | Agashe | B23K 11/087 219/85.13 |
| 2006/0124907 A1* | 6/2006 | Takada | C23C 2/40 252/500 |
| 2015/0283643 A1 | 10/2015 | Dahlman et al. | |

FOREIGN PATENT DOCUMENTS

| | | |
|---|---|---|
| CN | 105803162 A | 7/2016 |
| CN | 106216824 A | 12/2016 |
| CN | 107138837 A | 9/2017 |
| JP | 2001287044 | 10/2001 |
| RU | 2591907 | 7/2016 |

(Continued)

OTHER PUBLICATIONS

See Search Report of PCT/IB2018/059096 dated Dec. 8, 2019 and Written Opinion.

*Primary Examiner* — Anthony M Liang
*Assistant Examiner* — Jacob J Gusewelle
(74) *Attorney, Agent, or Firm* — Davidson Kappel LLC

(57) ABSTRACT

A dual pass seam welding method for steels having a Ceq of greater than about 0.45. The first pass welds the immediately anneals the weld. On the second pass, the welder is disengaged, and the weld is subjected to a second anneal.

12 Claims, 17 Drawing Sheets

(56) References Cited

FOREIGN PATENT DOCUMENTS

| SU | 870459 | 10/1981 | |
|---|---|---|---|
| WO | WO2004002673 | 1/2004 | |
| WO | WO 2008/086028 A1 | 7/2008 | |
| WO | WO2008/088834 A1 | 7/2008 | |
| WO | WO-2008086028 A1 * | 7/2008 | ............. B23K 11/16 |

* cited by examiner

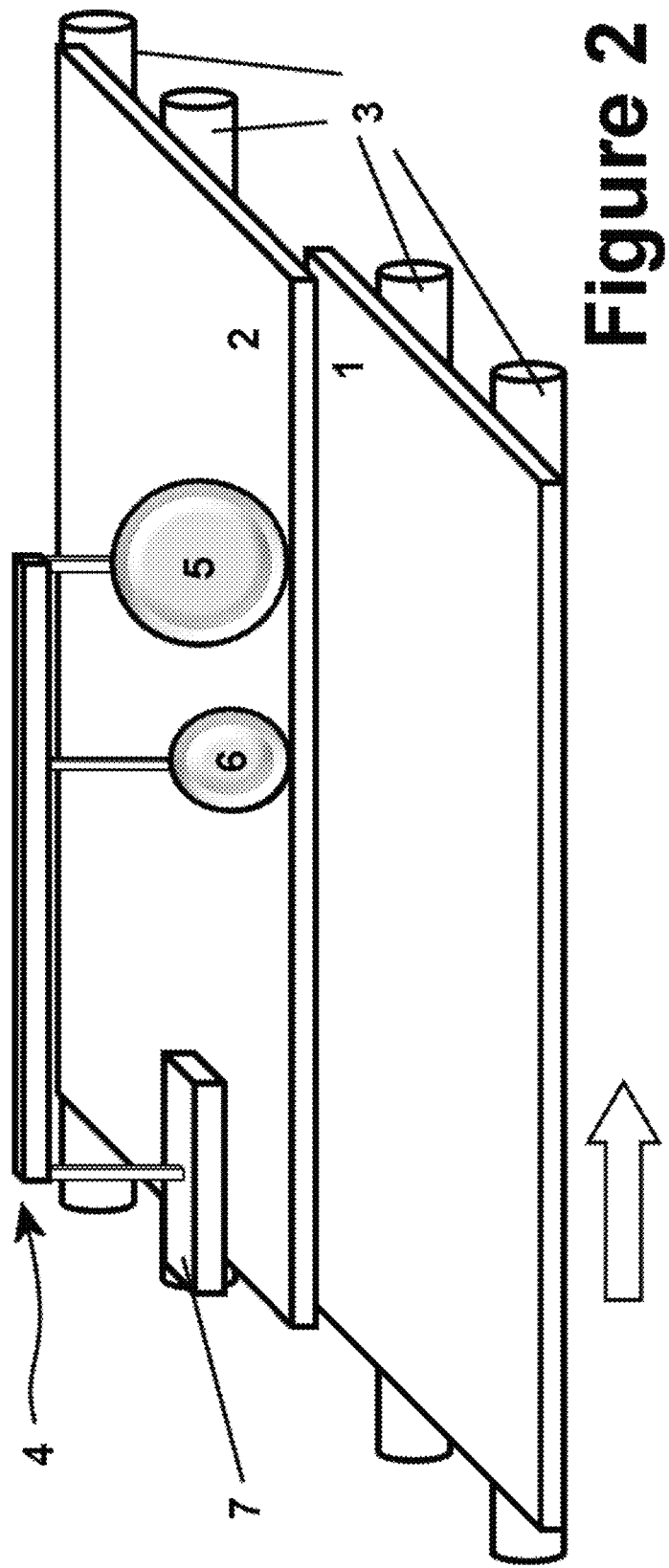

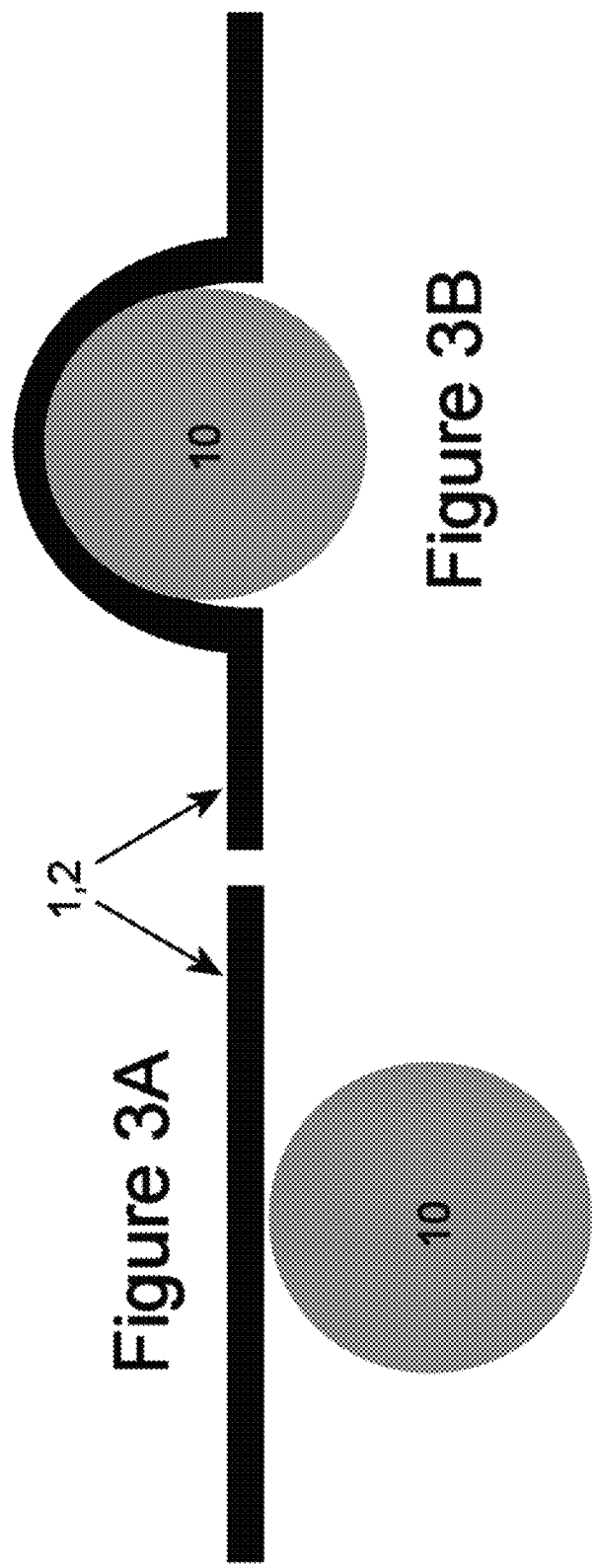

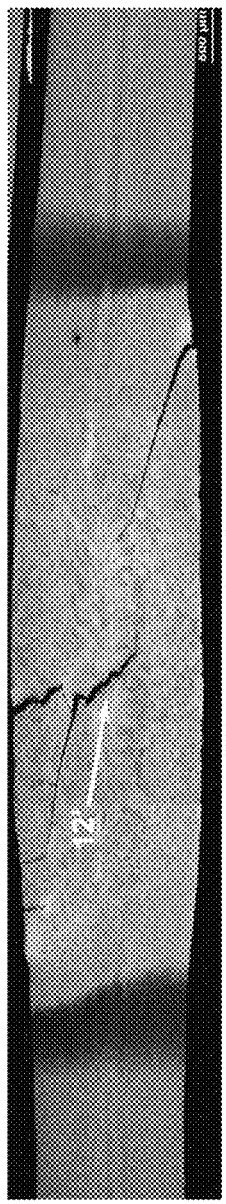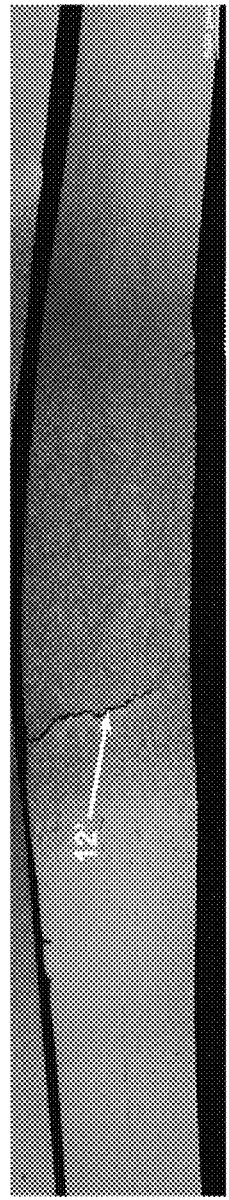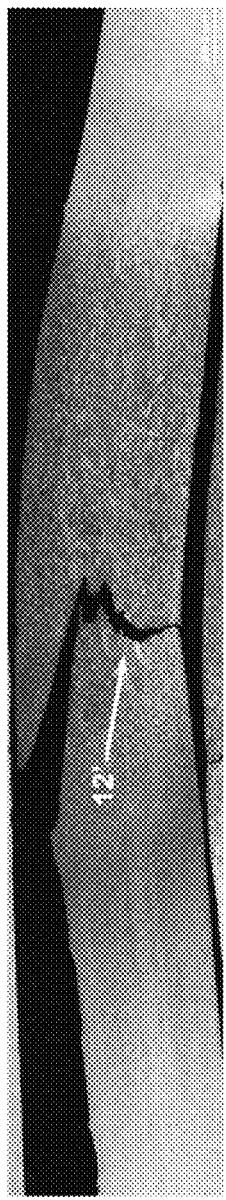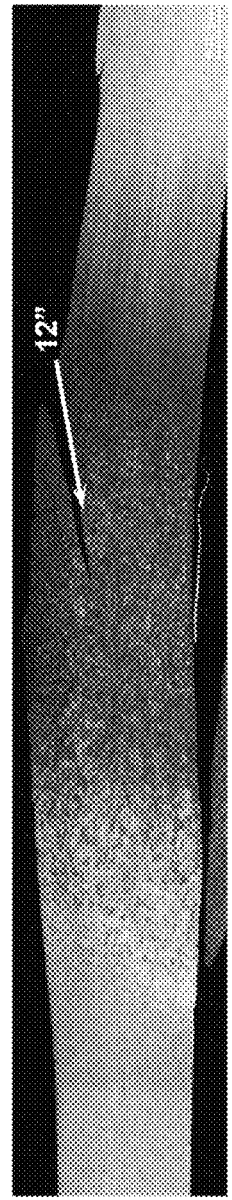

DUAL PASS, DUAL ANNEAL WELDING METHOD FOR JOINING HIGH STRENGTH STEELS

FIELD OF THE INVENTION

The present invention relates to welding technology. More particularly the present invention is related to welding techniques for joining high strength steels such as automotive high strength steels (AHSS). Most specifically, the present invention relates to a dual pass, dual anneal welding technique for joining AHSS type steels.

BACKGROUND OF THE INVENTION

This invention relates to welding and heat-treatment apparatus and methods. More particularly, this invention is directed to methods for manufacturing seam or butt welds with reduced weld-zone hardness and improved weld-zone ductility and toughness. This invention is particularly useful in the production of high strength welds between coils of steel that are being cold rolled in a cold rolling mill.

Ubiquitously used throughout all modern industries, welded ferrous alloys have become the de facto standard in structural component design. Current trends in many fields have focused interest away from low-strength common mild steels towards high and ultra-high strength steels. These alloys are formulated to have greater tensile strengths than low-carbon steels, due to the specific microstructures that are produced during thermomechanical processing. Some examples of high strength steels currently in use in the automotive industry include dual-phase, martensitic, boron-treated, quench & partition, and transformation-induced plasticity steels. Other high-strength alloys include air, oil and water hardenable carbon steels and martensitic stainless steels. All of these are designed so that some volume percentage of martensite forms in the microstructure of the material. The resulting distorted body-centered cubic (BCC) or body-centered tetragonal (BCT) martensitic crystal structure formed in the hardened condition imparts high strength to the metal. These materials are ideally suited for structural components and assemblies, satisfying the requirements of high strength and toughness.

In the highly competitive automotive market, along with the energy and environment concerns, automotive manufacturers are continuously looking for methods to reduce fuel consumption and $CO_2$ emissions. This can be achieved via an effective weight reduction of vehicles by employing $3^{rd}$ generation advance high strength steel which also improves the crash performance of the automotive body parts.

Unfortunately, the tendency to form martensite, and relative high hardenability, of these and other ultra-high-strength alloys poses difficulties in welding. The chemistry of high strength steel grades results in a complete transformation from ferrite to austenite at high temperature, followed by a subsequent change to the hard martensite phase upon rapid cooling. In seam/butt welding applications, the natural weld cooling rate can be as high as 1000° C./s, sufficiently fast enough to produce a martensitic structure in most high strength, high-carbon alloys. The resulting martensitic structure produced is extremely brittle in the untempered condition. Cracking of the weld zone can occur for several reasons, including: Hydrogen induced cold-cracking, due to trapped hydrogen in the distorted BCC martensite crystal structure; Tensile stress applied to the weld increasing the risk of cracking; and Thermal induced stresses, due to the heat input during welding, degree of joint restraint, and the volume change upon martensite transformation.

Most forms of cracking result from shrinkage strains that occur as the weld metal cools to ambient temperature. If the contraction is restricted, the strains will induce residual tensile stresses that cause cracking. There are two opposing forces: the stresses induced by the shrinkage of the metal, and the surrounding rigidity of the base material. Large weld sizes, high heat input and deep penetrating welding procedures increase the shrinkage strains. The stresses induced by these strains will increase when higher strength base materials are involved. With higher yield strengths, higher residual stresses will be present.

SUMMARY OF THE INVENTION

Recently product steel development has developed highly alloyed (>0.3 wt. % of C) martensitic 3rd generation AHSS grade steels. Such steels have ultimate tensile strengths of approximately 2000 MPa or greater (M2000). These products can be made by casting, pickling, and annealing. Unfortunately, coils of the steel cannot be processed yet through continuous annealing lines because the presently available welding techniques have great difficulty in coil joining of such steels. After welding of the coils ends, the weld zone and its surrounding area convert to a fully martensitic structure, resulting in very brittle welds with many cracks in the nugget. The application of even a small load on this brittle zone results in weld breakage and plant downtime.

Most of the AHSS grades' coils are joined using the post weld heat treatment (PWHT) process, which increase the toughness of the weld. Currently, there are three methods available in the literature to weld steel coils in finishing mills (coating, annealing etc.) As used herein, $Ac_1$ is the temperature at which austenite begins to form during heating and $Ac_3$ is the temperature at which transformation of ferrite to austenite is completed during heating. The martensitic reaction begins during cooling when the austenite reaches the martensite start temperature ($M_s$) and the parent austenite becomes mechanically unstable. $M_f$ is the martensite finish temperature.

Method 1 is known as a "single pass weld only method" in which welding is done without any post weld heat treatment.

Method 2 is known as a "single pass annealing method" in which welding is done followed by immediate annealing. In this method, cooling is controlled between $Ar_3$ (austenite ferrite transformation temperature) and $M_f$ (martensitic finish temperature).

Method 3 is known as a "double pass with second pass annealing" method. In this method, post weld annealing is not applied immediately but rather after the welding process is done. Post weld heat treatment (PWHT) is applied once the weld temperature falls below the $M_s$ temperature.

Weld trials using all three prior art methods were used to weld M2000 and 0.35C-0.6Mn-0.5Si coil ends. 0.35C-0.6Mn-0.5Si is a steel which makes it possible to obtain Ultimate Tensile Stress (UTS) higher than 1800 MPa after heat treatment in Hot Press Forming. Unfortunately, satisfactory weld toughness was not achieved using any of these prior art techniques. The phase transformation (Ferrite-Pearlite) curve of M2000 on a CCT (continuous cooling temperature) diagram is further to the right side than that of earlier generations AHSS grades. Therefore, to transform the final microstructure to a more ferrite-perlite microstructure, elevated temperature should be retained for a longer time in the weld metal. This cannot be achieved in the coil joining application in the limited available time for welding during continuous production. Methods 1 and 2 produce a large volume of martensitic phases that are brittle and prone to cracks. Method 3 normally produces a sound joint in highly alloyed products by tempering the martensitic structure that is generated after the welding. However, using this practice on alloys such as M2000 produces cracks in the nugget and creates gaps at the overlap edges moments after welding. Post weld anneal of a crack enriched nugget region is useless.

Up to now, apart from these three traditional methods to join high carbon high alloy steels, there are no available methods to weld this kind of highly alloyed steel in coil joining applications.

Therefore, there is a need in the art for a novel method to produce sound welds of M2000 type alloys prime-to-prime that is sufficiently robust to get product through the continuous annealing line.

The present invention is a welding method. The method includes the steps of:
1) providing a first surface of a hardenable ferrous alloy having a composition that has a carbon equivalent (Ceq) of at least 0.45;
2) providing a second surface of a hardenable ferrous alloy having a composition that has a carbon equivalent (Ceq) of at least 0.45;
3) creating an overlap by overlapping the first surface and the second surface;
4) welding the first surface to the second surface by heating the first surface and the second surface at a sufficiently high enough temperature to raise the temperatures of the first surface and the second surface to at least the melting points of the alloys to form a weld;
5) cooling the weld to between the $Ac_3$ and $M_f$ temperatures of the alloys;
6) heating the weld to heat the weld at a rate of at least 10 C/sec to a temperature between the $M_s$ and $Ac_1$ temperatures of the alloys;
7) cooling the weld to below the $M_s$ temperatures of the alloys;
8) heating the weld at a rate of at least 10 C/sec to a temperature between the $M_s$ and $Ac_1$ temperatures of the alloys; and
9) cooling the weld to room temperature.

Ceq being defined as:

$$Ceq=C+A(C)*[Si/24+Mn/6+Cu/15+Ni/20+(Cr+Mo+Nb+V)/5+5B]$$

and $$A(C)=0.75+0.25\tan h[20(C-0.12)];$$

The composition of each of the elements C, Si, Mn, Cu, Ni, Cr, Mo, Nb, V, and B are in wt. percent.

At least one of the first surface and second surface may be formed of a hardenable ferrous alloy having a composition that has a carbon equivalent (Ceq) of at least 0.5.

The first surface may be an end of a first steel coil and the second surface may be an end of a second steel coil. The step of welding the first surface to the second surface may comprise electrical resistance seam welding. The step of electrical resistance seam welding may be performed using a mid-frequency direct current (MFDC) seam welder. The mid frequency direct current (MFDC) seam welder may include weld wheels and a post weld induction heater.

The seam welder may form the weld using two passes of the welder across the overlap. The first of the two passes may comprise; 1) seam welding, which is done by the weld wheels; and 2) immediately annealing the seam weld using the post weld induction heater. The second of the two passes may comprise; 1) disengaging the weld wheels; and 2) annealing the weld using the post weld induction heater.

The weld may have load and ductility ratios of at least 70%.

BRIEF DESCRIPTION OF THE FIGURES

FIG. 2 shows schematically a seam welder useful for performing the welding method of the present invention;

FIGS. 3A and 3B are schematic diagrams of an Olsen cup test;

FIGS. 16A-16D are macrographs of the weld nugget after bend testing for methods 1-4 respectively.

DETAILED DESCRIPTION OF THE INVENTION

Welding Technique Test and Experimental Procedures
M2000 Alloy

Figure 1A:
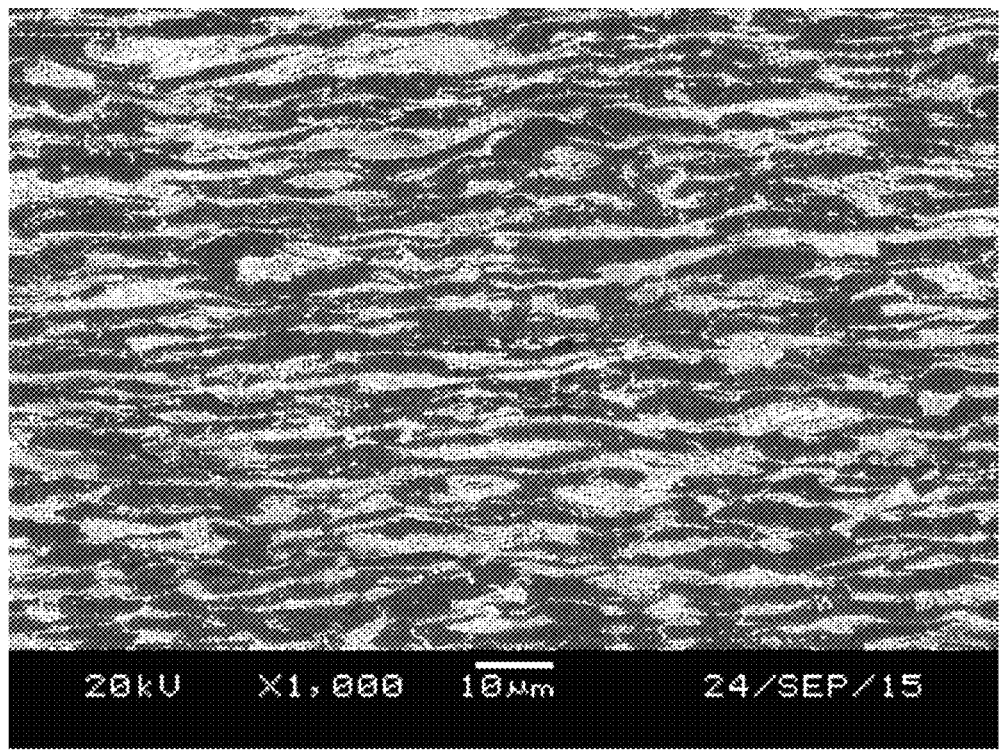
FIG. 1A is a micrograph at 1,000× showing the microstructure of the cold rolled full hard M2000 steel samples as received.
Figure 1B:
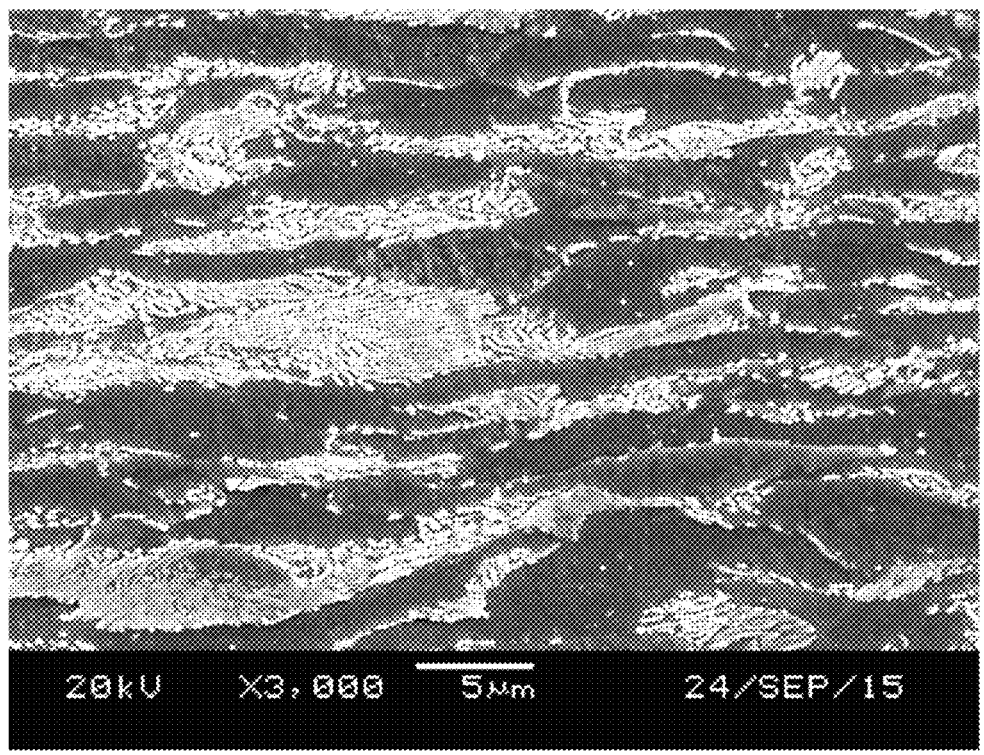
FIG. 1B is a micrograph at 3,000× showing the microstructure of the cold rolled full hard M2000 steel samples as received.

Cold rolled full hard M2000 steel samples with a thickness of 1.2 mm were used as the base metal (BM) for weld tests. The nominal and actual chemical compositions of the M2000 steel as well as their carbon equivalent (Ceq) are shown in Table 1 (alloy may also include Ti and inevitable impurities). The microstructure of the steel as received is shown in FIGS. 1A and 1B (at 1,000× and 3,000× respectively).

TABLE 1

| Elements | Ceq | C | Mn | Si | Cr | Nb ppm | B ppm |
|---|---|---|---|---|---|---|---|
| Composition | 0.56 | 0.294 | 0.471 | 1.563 | 0.510 | 280 | 20 |

Full hard M2000 only contains ferrite and fine perlite phases. The mechanical properties of full hard M2000 are shown in the Table 2. The UTS for a cold rolled full hard M2000 is almost half of what it will be after the annealing process, which is required to achieve the 2000 MPa UTS or greater.

TABLE 2

| Tensile Properties | | |
|---|---|---|
| Ultimate Tensile Strength, MPa | Yield Stress, MPa | Total Elongation % |
| 1027 | 955 | 5.5 |

Testing Welding Methods for Welding M2000

All welds were made by a mid-frequency direct current (MFDC) seam welder, shown schematically in FIG. 2. The welder 4 is used to weld the ends of two coils of steel (1 and 2) together so that they may be consecutively processed through continuous processing lines such as pickling lines, continuous annealing lines, continuous galvanizing/galvannealing lines, etc. The welder consists of weld wheels 5 (one on top and an unseen wheel underneath the steel). The welding current is passed between the weld wheels 5 through the steel sheets 1 and 2. This current causes the steel to heat due to resistive heating. This heat melts the steel at the interface of the two sheets. The welder 4 welds the steel in the direction of the arrow in FIG. 2. After the steel is heated/welded by the electrode wheels 5, the melted steel sheets are mechanically forged together by the post-planishing wheels 6 (one on top and the other unseen underneath). This forces the molten metal of the steel sheets 1, 2 to combine forming a single weld seam/nugget. It also flattens the overlapping edges of the sheets so that there is no "step" feature at the weld interface. Finally, the welder also includes a post weld induction heater 7 for annealing the weld. It should be noted that depending on the welding technique, the induction heater may be turned on or off.

The three prior at welding methods and the inventive welding method were used to weld full hard samples of M2000 and 0.35C-0.6Mn-0.5Si. The microstructure and mechanical properties of all welded samples were compared.

In the first prior art method, the welder 4 makes only a single weld pass. That is, the weld is being done in single pass without annealing (i.e. the post weld induction heater 7 is turned off). In the second prior art method, the weld is done followed by immediate annealing on the single pass. That is, the post weld induction heater 7 is turned on and the weld nugget is annealed directly after the weld is completed, before it has time to cool too much. The third prior art method is a so called double pass method, where the second pass is for annealing the weld nugget. In this method, welding is done, and the strip is allowed to cool till the temperature of the weld drops to the $M_s$ temperature of that grade then annealing is performed in the second pass. That is, the initial pass welds the steel sheets together, but the post weld induction heater 7 is turned off so that the weld nugget temperature drops to the $M_f$ temperature or lower. Then on the second pass, the welder is disengaged and the post weld induction heater 7 is turned on to anneal the weld nugget. As will be seen below, none of these three prior art methods could successfully create a strong enough and durable enough weld to allow the weld joint to pass through the continuous processing lines.

The inventors have created a novel fourth welding technique. The technique is a dual pass method. In the first pass welding is done followed by immediate annealing on the first pass. That is, the post weld induction heater 7 is turned on and the weld nugget is annealed directly after the weld is completed, before it has time to cool too much. Once the first pass has been completed, the weld metal is cooled to below $M_s$ or $M_f$ temperature of the steel grade. Then on the second pass, the welder 4 is disengaged and the post weld induction heater 7 is turned on to anneal the weld nugget. Table 3 discloses the welding parameters for each weld method using the mid frequency direct current (MFDC) seam welder. Where there are two values separated by a slash, the values represent first pass and second pass respectively.

TABLE 3

| Samples | Methods | Speed m/mn | Current KAmps | Force N/mm² | Post Planishing N/mm² | Overlap OS mm | Overlap DRV mm | Annealing Temp, ° C. |
|---|---|---|---|---|---|---|---|---|
| Weld-1 | Single Pass Weld only | 1.5 | 16.5 | 0.50 | 7.24 | 1.45 | 2.72 | NA |
| Weld-2 | Single Pass w/Annealing | 1.5 | 16.5 | 0.50 | 7.24 | 1.45 | 2.72 | 760 |
| Weld-3 | Double Pass, Second Pass Annealing | 1.5/1.5 | 16.5 | 0.50 | 7.24 | 1.45 | 2.72 | 760 |
| Weld-4 | Double Pass, Double Annealing | 1.5/1.5 | 16.5 | 0.50 | 7.24 | 1.45 | 2.72 | 760 |

Weld Characterizations

The mechanical properties and microstructure of all four weld types as applied to full hard M2000 were obtained. Mechanical properties were tested through ball and microhardness testing, and the microstructure was observed with optical and scanning electron microscopy. Metallography samples were cut, mounted, and polished to a 1 μm finish using standard metallographic techniques. They were then etched with 2% nital to reveal microstructure. Vickers microhardness profiles were taken from the polished and etched weld surfaces. Hardness indentations were made using a 200 g indenter load and a 15 second dwell time. Indents were spaced far enough apart to not interfere with each other. Fifty indentations were taken across the cross section.

Olsen cup testing was carried out on the samples with a 22.2 mm diameter ball 10 using a 25.4 mm/min punch speed. FIGS. 3A and 3B are schematic diagrams of an Olsen cup test. FIG. 3A is from just before the test has begun and FIG. 3B is at the end of the test. The test was stopped when a crack was visible on the sample tested. The punch height at failure was described as the limiting dome height (LDH). The LDH of the weld was compared to that of the base material by dividing the weld LDH by the base material LDH, which is referred to as the ductility ratio. Load ratio was calculated as the ratio of maximum applied load on the weld to that of the maximum applied load of the base metal as recorded before the fracture in the dome. The minimum desired value for ductility and load ratio is 70%.

Figure 4:
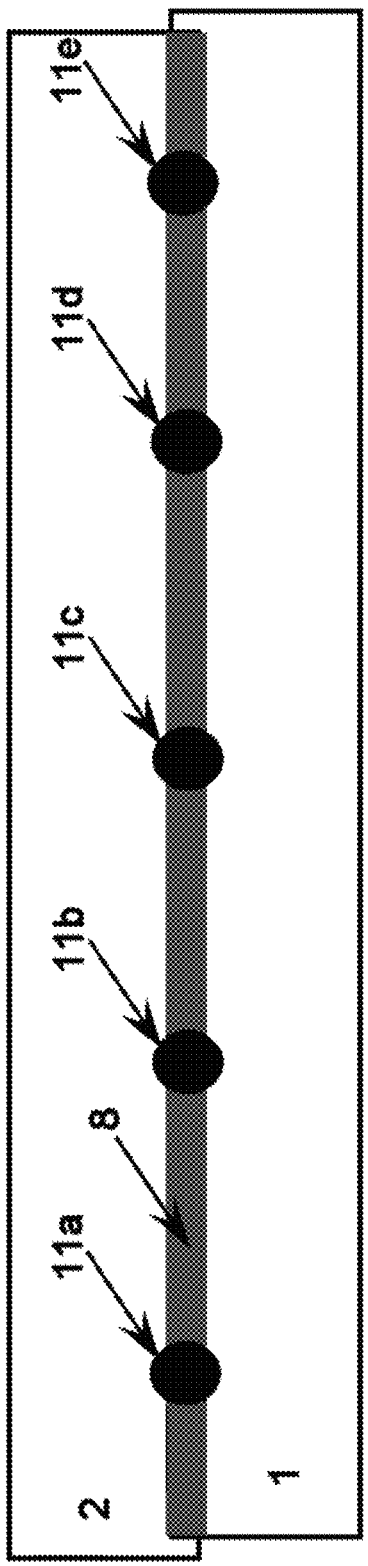
FIG. 4 is a schematic diagram of the weld section between steel coil strips 1 and 2, the weld line 8 is specifically shown.

FIG. 4 is a schematic diagram of the weld section between steel coil strip 1 and steel coil strip 2, the weld line 8 is shown. The Olsen cup testing was performed at five distinct locations: 11a) at the line operator's side of the welder; 11b) one quarter across the strip; 11c) the center of the strip; 11d) three quarters across the strip; and 11e) on the drive side of the strip. The test positions are shown on FIG. 4.

Figure 5A:
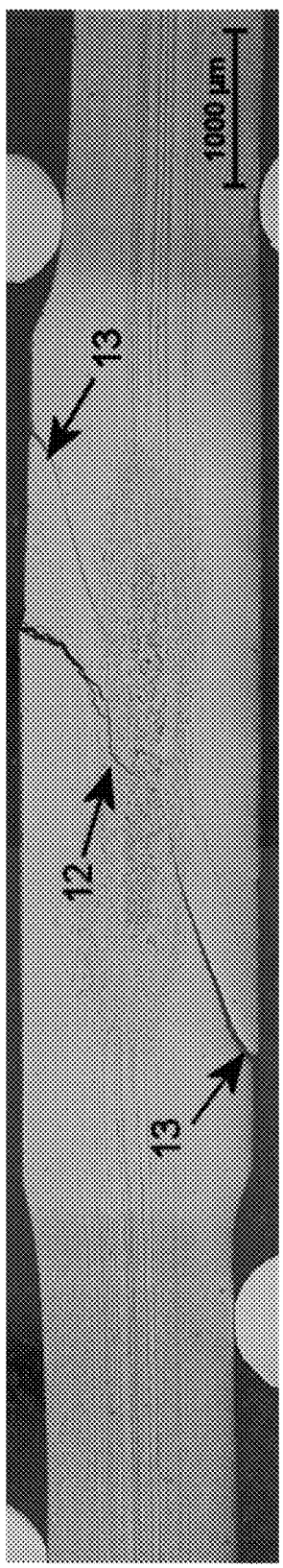
FIG. 5A is a macrograph of a cross section sample of a seam weld between two sheets of full hard M2000 using prior art welding method 1.
Figure 5C:
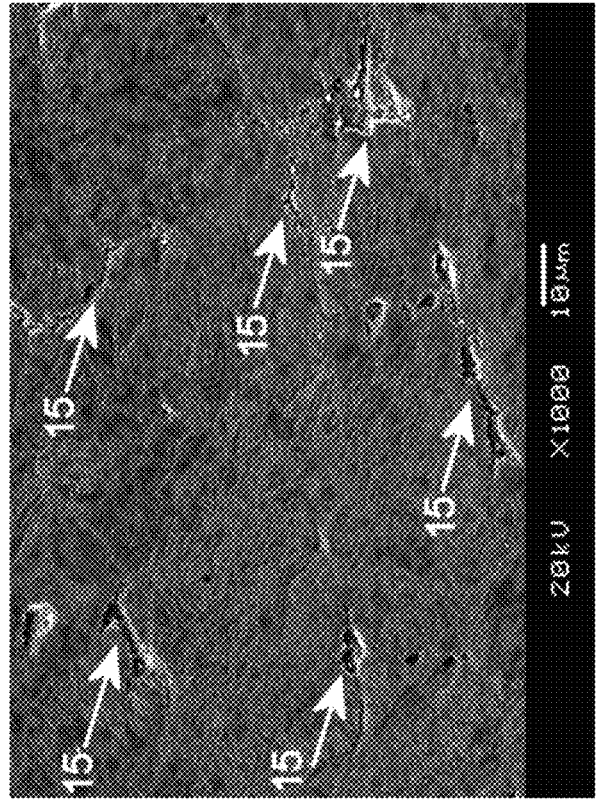
FIGS. 5B and 5C are SEM images taken at 1000× of the weld nugget region of the full hard M2000 weld using prior art welding method 1.
Figure 5B:
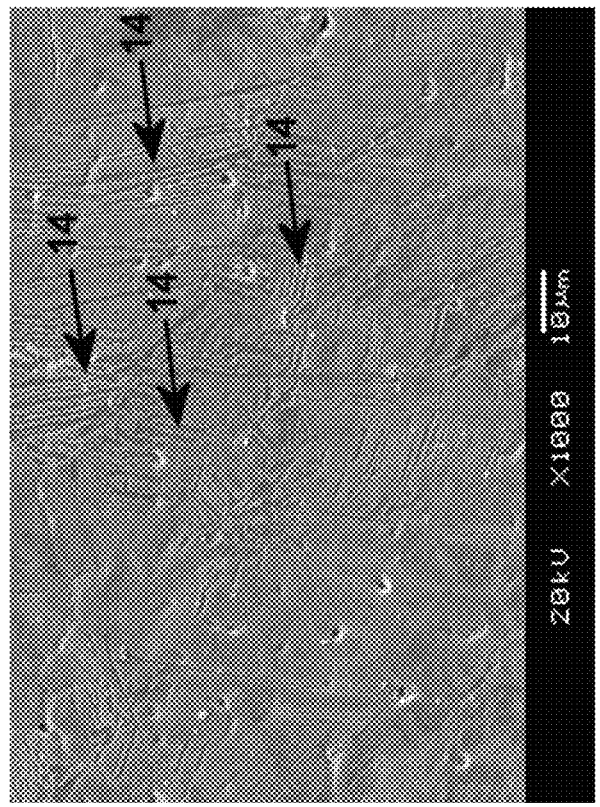

FIG. 5A is a macrograph of a cross section sample of a seam weld between two sheets of full hard M2000 using prior art welding method 1 (single pass, no anneal). As can be seen the weld nugget has massive long cracks 12. Also, notches 13 were opened up, there is no solid-state bonding present near the notches. Therefore, stress under loading does not distribute equally at the vicinity of the nugget. Instead it is concentrated at the nugget. FIGS. 5B and 5C are SEM images taken at 1000× of the weld nugget region of the full hard M2000 weld using prior art welding method 1. It can be seen from this that there is an almost 100% martensitic phase with much Lath martensite 14 present in the weld microstructure with plenty of microcracks 15.

In resistance seam welding (RSW) applications, the natural weld cooing rate can be as high as 1000° C./sec, sufficiently fast enough to produce a martensitic phase in most high carbon AHSS grades.

Below is a description of the cause of cracks in the weld nugget due to thermally induced stress during weld cooling. After the molten nugget is formed at the faying surfaces of sheet metal, the outside layer of the nugget cools rapidly due to the heat conduction effect. Therefore, phase transformation of $\gamma$ (FCC) to $\alpha^I$ (BCT) occurs at outer layer of weld nugget, resulting in nugget expansion. Similarly, the layer adjacent to the outer layer experiences the same expansion effect and so on until, eventually, the whole nugget transforms into a stable martensitic structure. During each expansion step, contraction also happens due to shrinkage. Strains occur as the weld metal cools to ambient temperature. If this contraction is restricted, the strains will induce residual tensile stresses that cause cracking. Therefore, the simultaneous effect of expansion and contraction results in the cracking in high carbon-highly alloys steel. As shown in FIG. 5A there is a gap (notch 13) at the edge of the overlap between the two steel strips. This gap is thought to be created due to the spring back effect of M2000 or to nugget expansion during the cooling. Materials like M2000 usually have very high spring back effect. Therefore, after the welding, in the solidification stage, welded strips are trying to go back to their original position creating gaps and cracks in the nugget region. Once micro cracks are present in the dendritic direction due to the thermal stresses or materials high spring back effect, cracks initiated from sheet notch regions meet the micro cracks at the edge of the nugget and further propagate along the nugget outer surface.

Figure 6A:
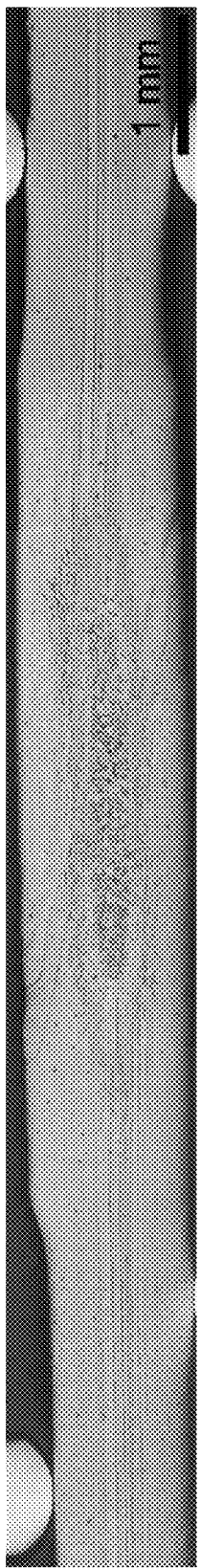
FIG. 6A is an image showing the overall weld nugget sample welded using prior art welding method 2.
Figure 6B:
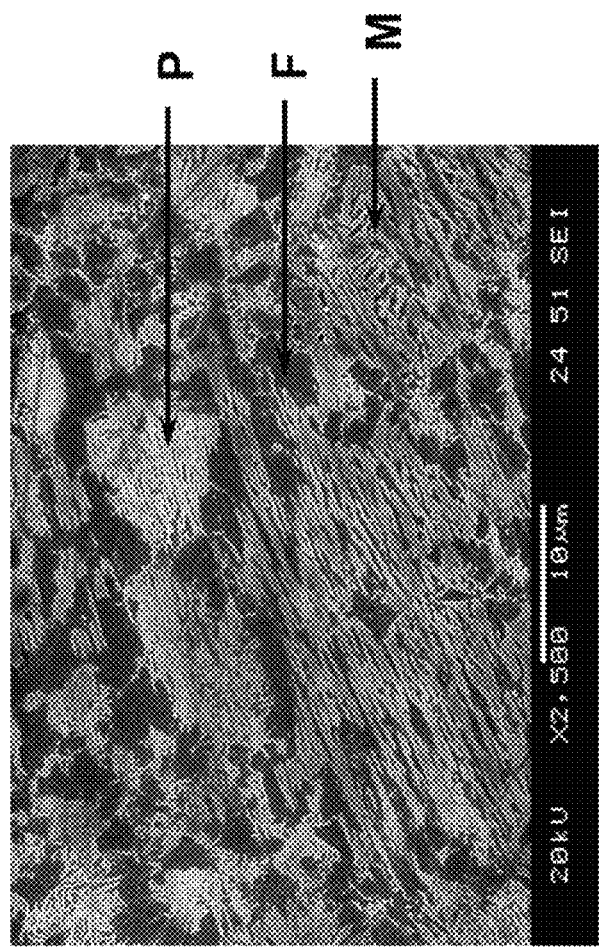
FIG. 6B is an SEM micrograph image taken at 2,500× of the weld nugget welded using prior art welding method 2.

FIG. 6A is an image showing the overall weld nugget sample welded using prior art welding method 2 (single pass weld with immediate annealing). It can be seen from FIG. 6A that cracks were not present. Also, cracks are not seen in micrograph image FIG. 6B, which is an SEM micrograph image taken at 2,500× of the weld nugget. Welding method 2 appears to help prevent cracks that are generating during the weld cooling stage because of its slower cooling rate (due to annealing). FIG. 6B shows that the weld from method 2 contains ferrite (F), perlite (P) and martensitic (M) structures in the center of the nugget. With reference to a CCT diagram of M2000, the final microstructure of weld 2 can be understood. In the single pass, single anneal method there is a delay of a few seconds between the welding and annealing of the weld region. Therefore, during the cooling of the weld, the weld nugget temperature was thought be in between the $M_s$ and $M_f$ temperatures of the M2000. This is confirmed by the evidence of martensite presence in the microstructure. During the annealing process, the temperature of the weld nugget again increases to just below to the $AC_1$ temperature of M2000 (~760° C.). At this point, the remaining austenite is transformed into ferrite and perlite phases during cooling. However, the volume fraction of martensite is higher in the microstructure of the single pass annealing welded sample, which limits the toughness of the weld (discussed later).

It should be noted that weld method 3 resulted in similar weld issues as weld method 1, because there is no annealing in the first weld pass on weld method 3. Thus, the weld nugget has massive long cracks and notches and annealing crack enriched regions does not alleviate the cracking issue.

Figure 7A:
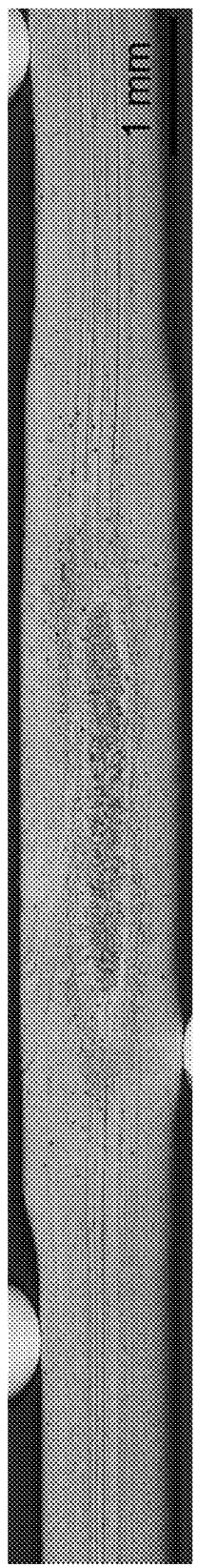
FIGS. 7A and 7B show SEM micrographs of an M2000 sample welded with inventive welding method 4.
Figure 7B:
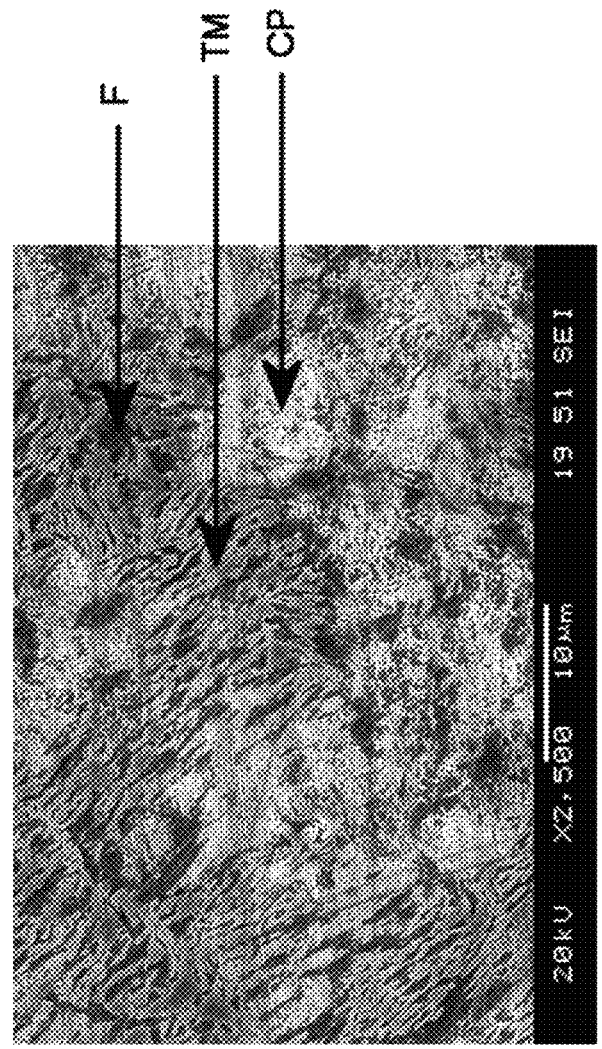

FIGS. 7A and 7B show SEM micrographs of a M2000 sample welded with inventive welding method 4 (double pass double annealing). As shown in FIG. 7A, a crack free nugget was also achieved in this weld sample since this method goes through the same steps of the single pass annealing method (method 2). It can be seen from magnified image of FIG. 7B that the nugget region was enriched with carbides formation, meaning that all martensite was transformed into the tempered martensite (TM) during the second pass annealing. Further, due to the second pass annealing, all perlite that formed during the welding and annealing in the first pass transformed into course perlite (CP). Because the weld microstructure contains course perlite and tempered martensite the weld has improved toughness.

Figure 8:
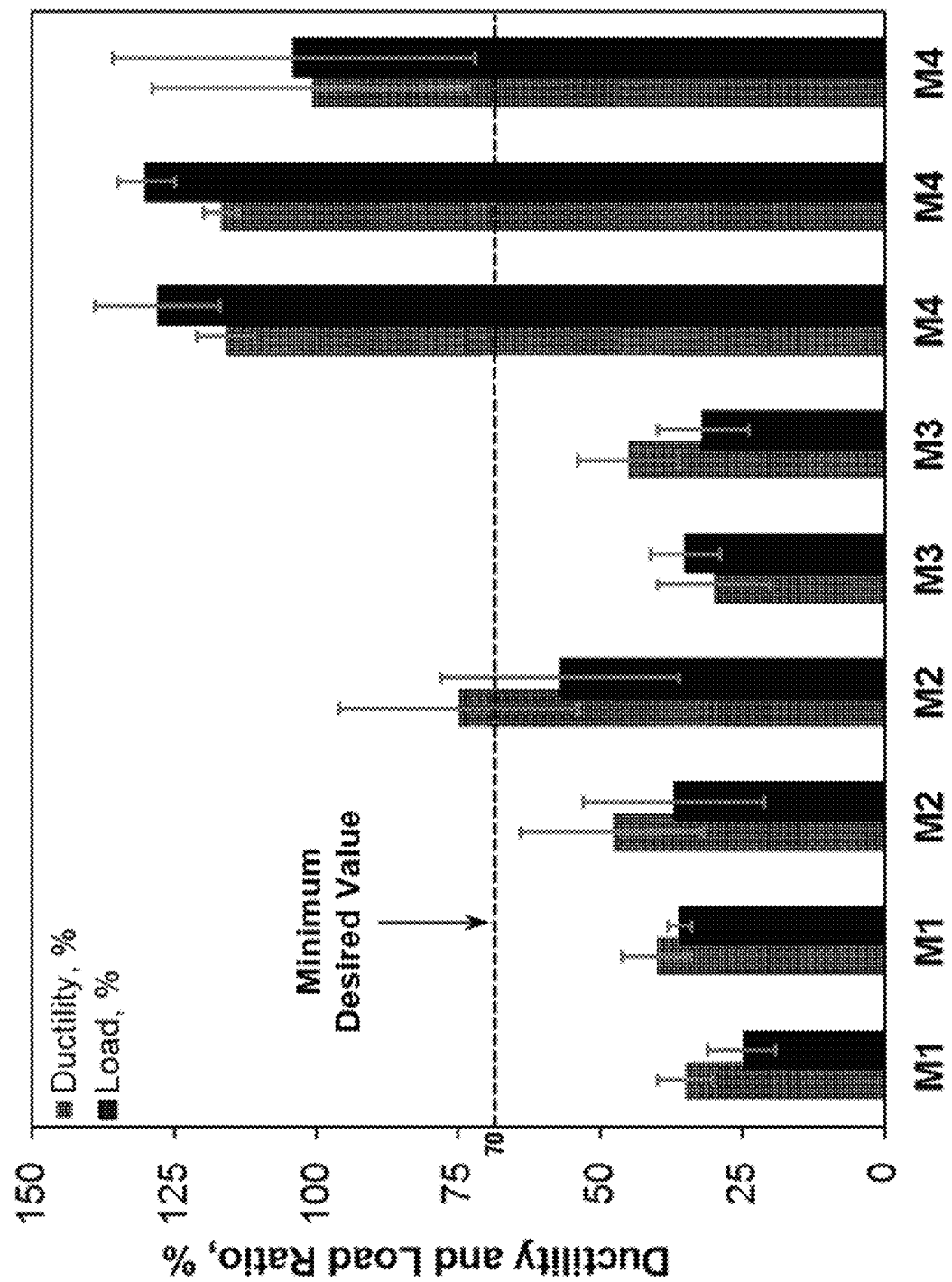
FIG. 8 plots the Olsen Cup test results of M2000 welded using the four different methods.

FIG. 8 shows the Olsen Cup test results of M2000 welded using the four different methods (M1, M2, M3, and M4). Specifically FIG. 8 plots the load and ductility ratios as defined above for 2 examples each of M1-M3 and 3 examples of M4. The load and ductility ratios must be greater than 70% to consider the weld quality to be sound enough to allow the weld to pass through the continuous annealing line without damage. As can be seen from FIG. 8, welds by methods 1, 2 and 3 failed to meet the minimum requirement of desired weld quality. However, in contrast, welds produced using method 4 achieved almost double the weld toughness as compare to samples welded using methods 1, 2 and 3. Higher weld toughness of samples welded using method 4 are attributed to the two factors, (1) a crack free weld nugget was achieved and (2) a tempered martensite and coarse perlite microstructure was achieved.

In the inventive (double pass, double annealing) welding method 4, the first annealing is immediate right after welding. This reduces the cooling rate and therefore prevents the crack formation. The second strategic annealing pass tempers the brittle martensite.

Figure 9A:
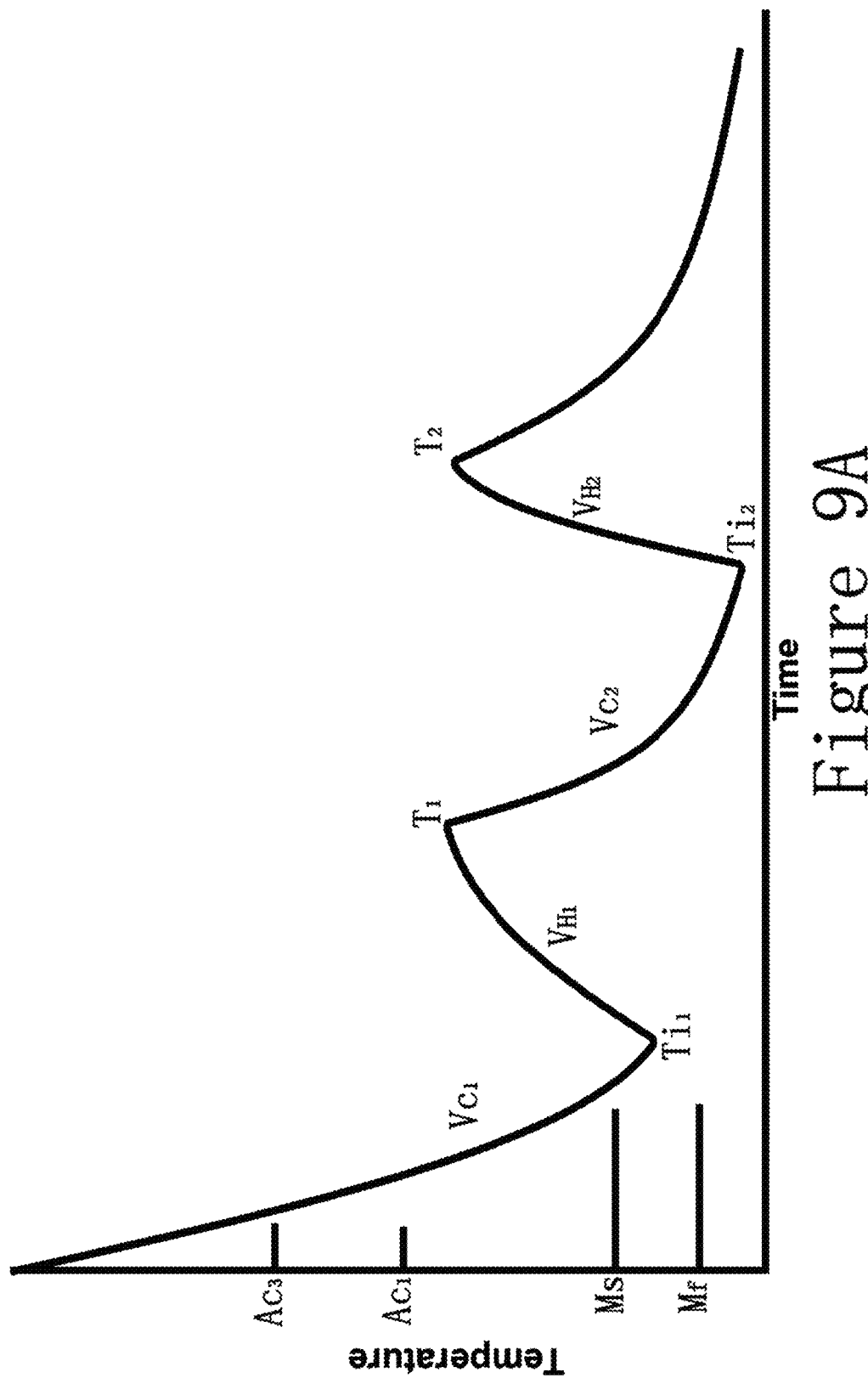
FIG. 9A depicts a generic embodiment of the heating/cooling cycle vs time of the present inventive welding method

FIG. 9A depicts a generic embodiment of the heating/cooling cycle vs time of the present inventive welding method. The weld is cooled directly from the seam weld step to a temperature of $Ti_1$ at a cooling rate of $Vc_1$. Where $Mf<Ti_1<AC_3$. The weld is then heated to a temperature of $T_1$ at a heating rate of $VH_1$. Where $Ms<T_1<Ac_1$. The weld is then cooled to a temperature of $Ti_2$ at a cooling rate of $Vc_2$ where $T_{i2}<Ms$ or Mf. Then weld is then reheated to $T_2$ at a heating rate of $V_{H2}$. Where $Ms<T_2<Ac_1$. The weld is then allowed to air cool (>10° C./sec) to room temperature. Table 4 gives the temperatures (in ° C.) and heating/cooling rates (in ° C./sec) for the example alloys M2000 and 0.35C-0.6Mn-0.5Si alloys.

TABLE 4

| Alloy | $Ti_1$ | $T_1$ | $Ti_2$ | $T_2$ | $V_{C1}$ | $V_{H1}$ | $V_{C2}$ | $V_{H2}$ |
|---|---|---|---|---|---|---|---|---|
| M2000 | 300 | 760 | 150 | 760 | >15 | >10 | >15 | >10 |
| 0.35C—0.6Mn—0.5Si | 250 | 693 | 150 | 650 | >15 | >10 | >15 | >10 |

Figure 9B:
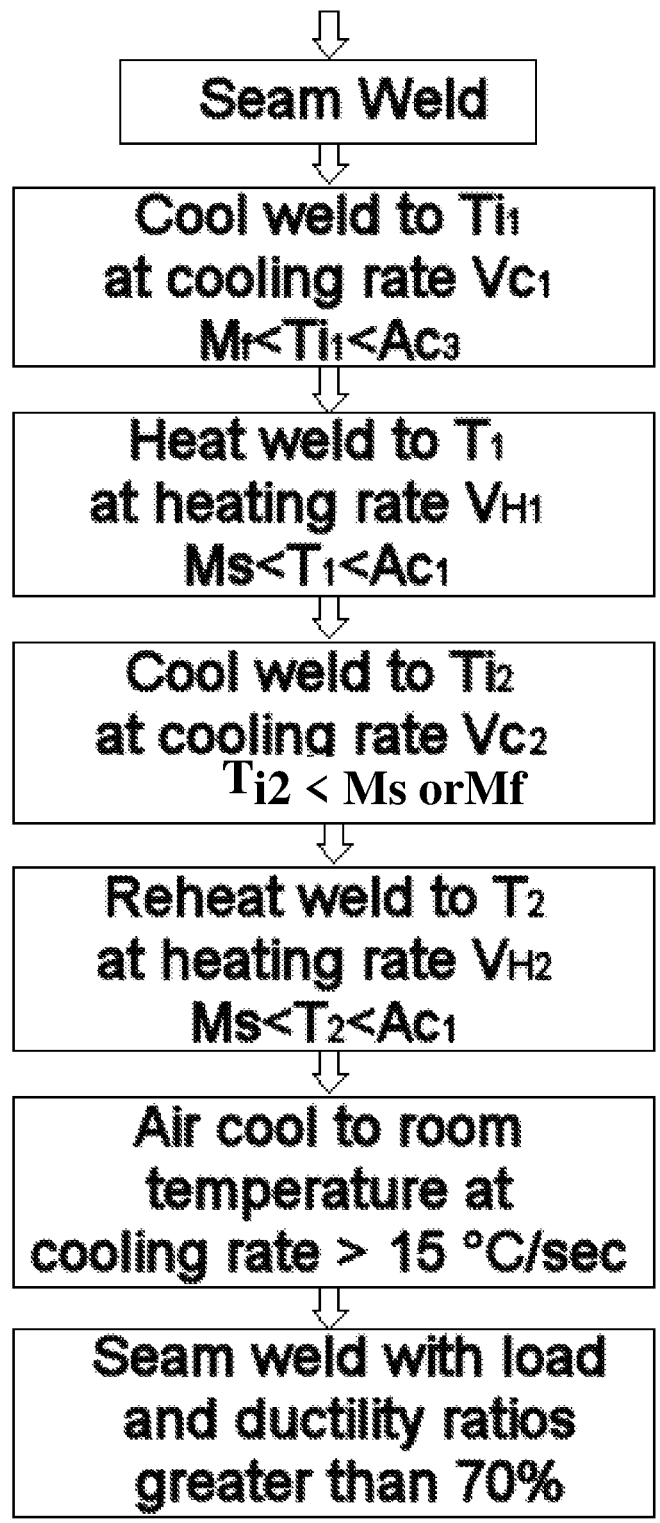
FIG. 9B depicts a flowchart of the inventive welding method 4.

FIG. 9B depicts a flowchart of the inventive welding method 4. First the two steel pieces are seam welded to one another, preferably by electric current welding such as for example mid frequency direct current (MFDC) seam welding. While electric current welding is the preferred method of joining the pieces of steel, any means known for seam welding the pieces together can be used. Once the weld is formed, the weld is allowed to cool to a temperature $Ti_1$ between the $Ac_3$ and the $M_f$ temperatures for the specific steel being welded at a cooling speed of $Vc_1$. Then the seam weld is heated to a temperature $T_1$ below the $Ac_1$ temperature but above the $M_s$ temperature by heating at a rate of $V_{H1}$. Next, the seam weld is allowed to cool to a temperature $Ti_2$ which is below Ms or Mt at a cooling rate of $Vc_2$. Next the seam weld is reheated to a temperature T which is below the $Ac_1$ temperature but above the $M_s$ temperature by heating at a rate of $V_{H2}$. Finally, the seam weld is allowed to air cool to room temperature at a cooling rate >15° C./sec.

The inventors have found that inventive method 4 is very advantageous to alloys having a composition with relatively high carbon equivalent. The inventors use the carbon equivalent formula developed in 1983 by Yurioka, et al. Their carbon equivalent equation was the famed CEN (interchangeable herein with Ceq), wherein:

$$CEN = C + A(C) * [Si/24 + Mn/6 + Cu/15 + Ni/20 + (Cr + Mo + Nb + V)/5 + 5B]$$

where:

$$A(C) = 0.75 + 0.25 \tan h[20(C - 0.12)]$$

The composition of each of the elements C, Si, Mn, Cu, Ni, Cr, Mo, Nb, V, and B are in wt. percent.

Figures 10A, 10B:
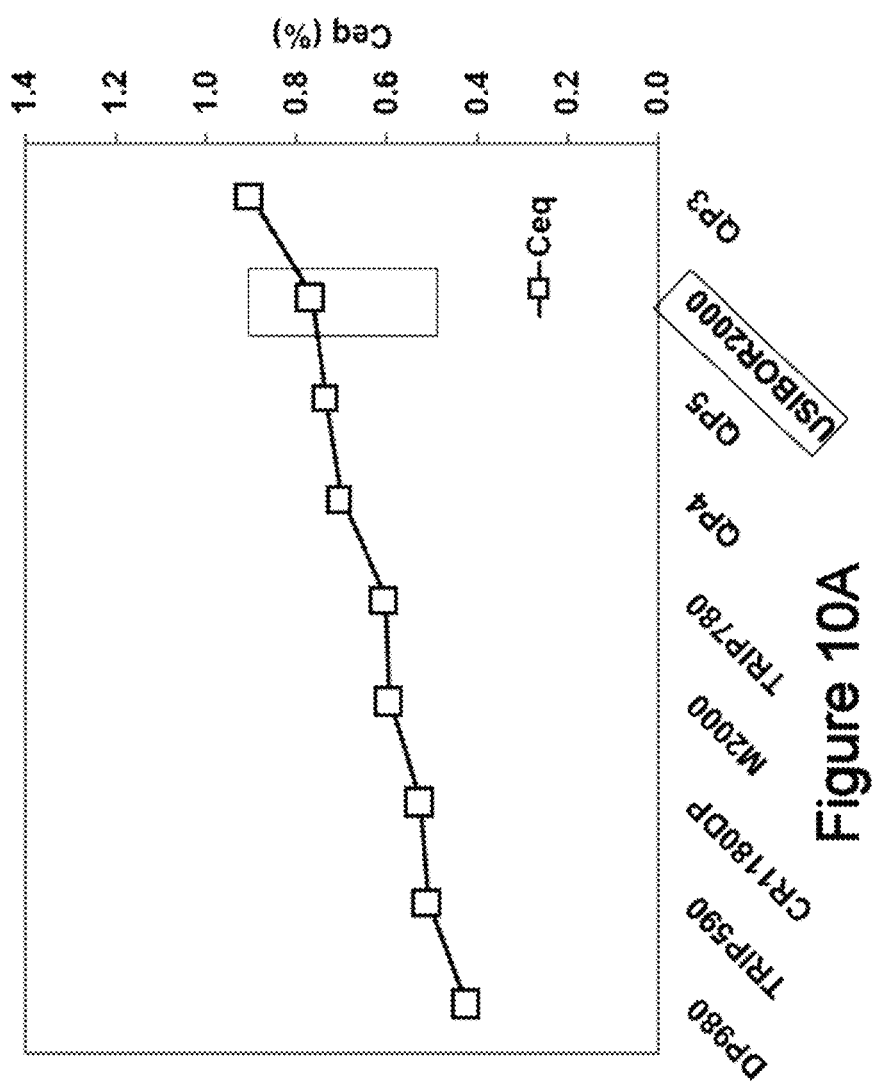
FIG. 10A plots the Ceq (CEN) for various steel alloy grades.
FIG. 10B is a table showing the weldability of steels of varying Ceq.

The inventors have seen that as the carbon equivalent of an alloy increases, the weldability decreases. FIG. 10A plots the Ceq (CEN) for various steel alloy grades. FIG. 10B is a table showing the weldability of steels of varying Ceq. The present welding method is most advantageously used for welding steels having a Ceq greater than or equal to about 0.45. The inventive method is more useful in alloys having a Ceq of 0.5 or greater. The Ceq of the M2000 alloy of the previous example is nominally 0.57. As shown above, the inventive method works well on the M2000 alloy which has a Ceq of greater than 0.5.

0.35C-0.6Mn-0.5Si

In the past many weld trials were conducted on prime-to-prime full hard 0.35C-0.6Mn-0.5Si. None of these weld trials resulted in successful prime-to-prime welds. Since chemistry and CCT of 0.35C-0.6Mn-0.5Si and M2000 are close, the inventors believed that the inventive welding technique would work for 0.35C-0.6Mn-0.5Si. The inventive welding method was tested on full hard 0.35C-0.6Mn-0.5Si. The mechanical properties and microstructures of welds and the three prior art methods are discussed herein below.

The chemical composition of the 0.35C-0.6Mn-0.5Si steel as well as its carbon equivalent (Ceq) is shown in Table 5.

TABLE 5

| Steel Grade | Ceq | C | Mn | Si | Ni | Mo | Cr | B |
|---|---|---|---|---|---|---|---|---|
| 0.35C—0.6Mn—0.5Si | 0.74 | 0.340 | 0.597 | 0.532 | 0.400 | 0.171 | 0.330 | 0.032 |

The mechanical properties of full hard 0.35C-0.6Mn-0.5Si are shown in the Table 6. As with the M2000, the Ultimate Tensile Strength (UTS) for a cold rolled full hard 0.35C-0.6Mn-0.5Si is almost half of what it will be after the annealing process, which is required to achieve a UTS of 1800 MPa or greater.

TABLE 6

| Tensile Properties | | |
|---|---|---|
| Ultimate Tensile Strength, MPa | Yield Stress, MPa | Total Elongation % |
| 1026 | 951 | 4.6 |

Figure 11A:
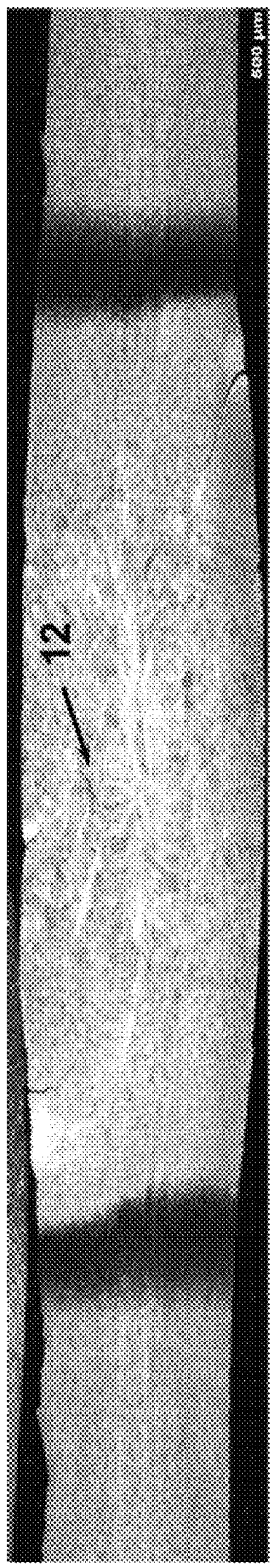
FIGS. 11A-11C are macro/micrographs of a weld of 0.35C-0.6Mn-0.5Si using prior art method 1.
Figure 11C:
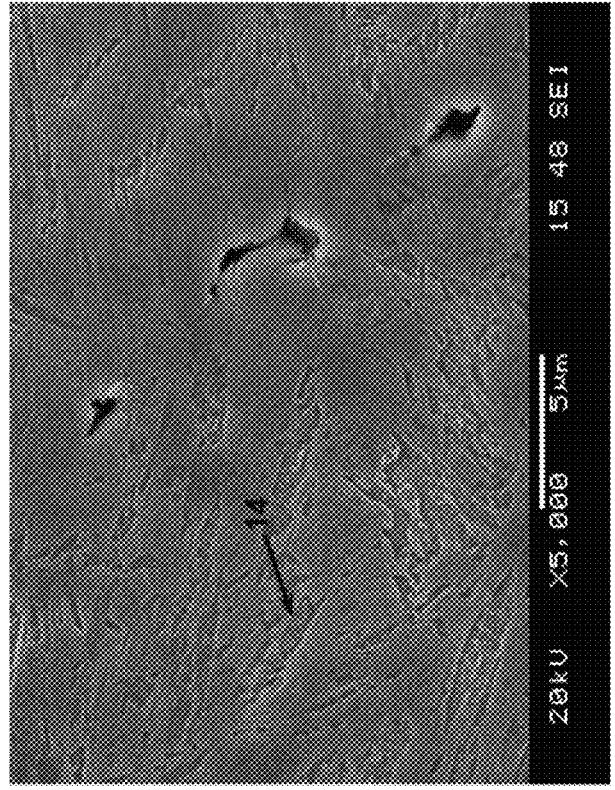
Figure 11B:
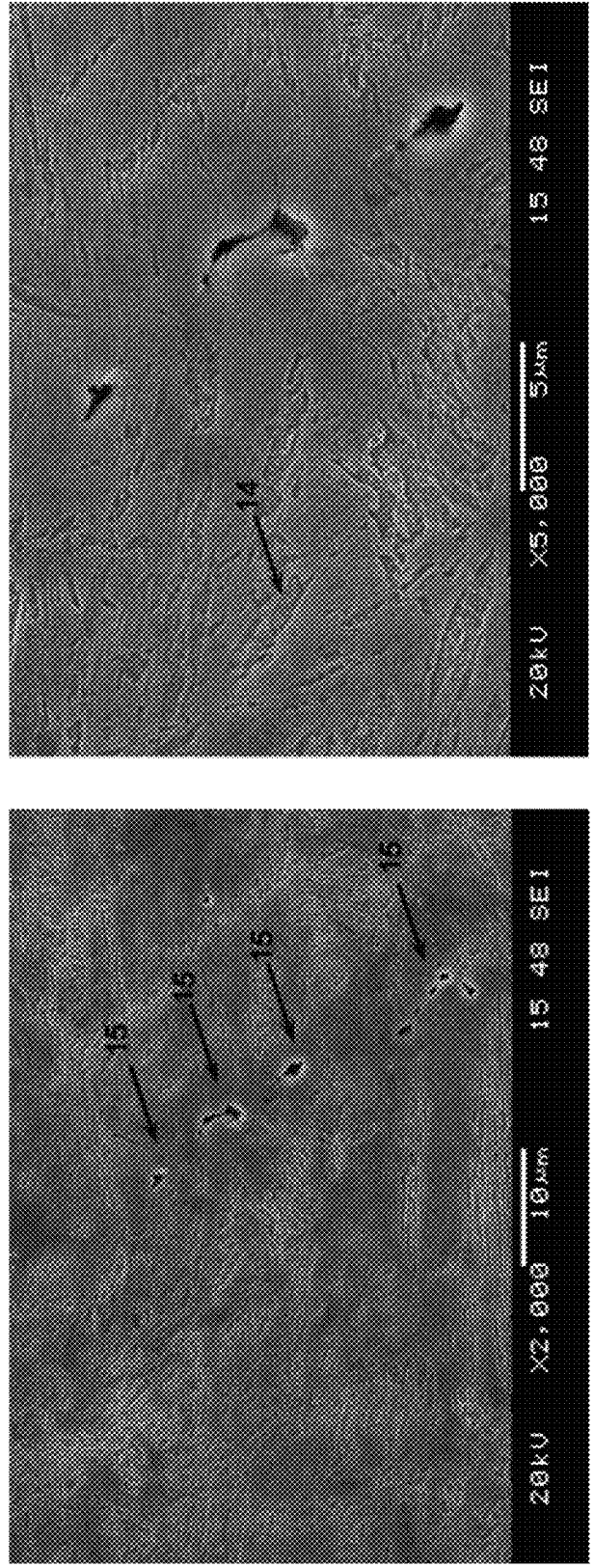

Prime-to-prime welds of 0.35C-0.6Mn-0.5Si steel were performed using the three prior art welding techniques and the inventive welding method 4. FIGS. 11A-11C are macro/micrographs of a weld of 0.35C-0.6Mn-0.5Si using prior art method 1. FIG. 11A is a macrograph of the weld showing macroscopic cracks 12 in weld nugget. FIG. 11B is a micrograph of the weld nugget at 2,000× magnification showing microcracks 15. FIG. 11C is a micrograph of the weld nugget at 5,000× magnification showing lath martensite 14.

Figure 12A:
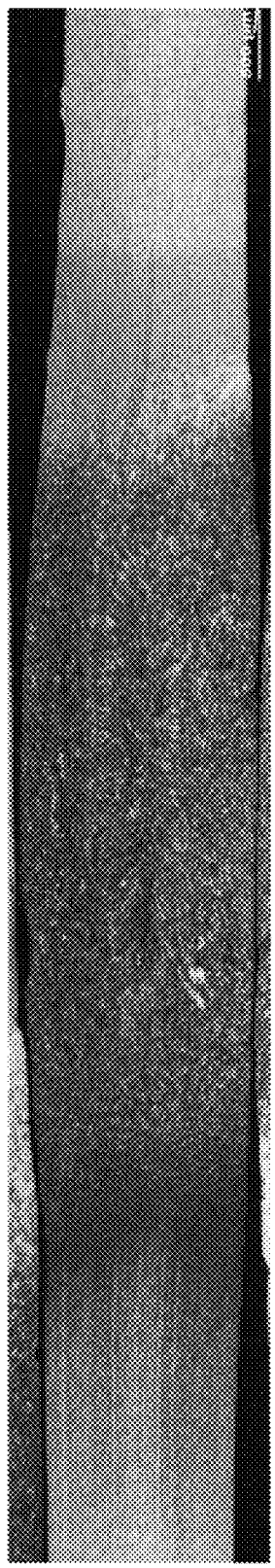
FIGS. 12A-12C are macro/micrographs of a weld of 0.35C-0.6Mn-0.5Si using prior art method 2.
Figure 12C:
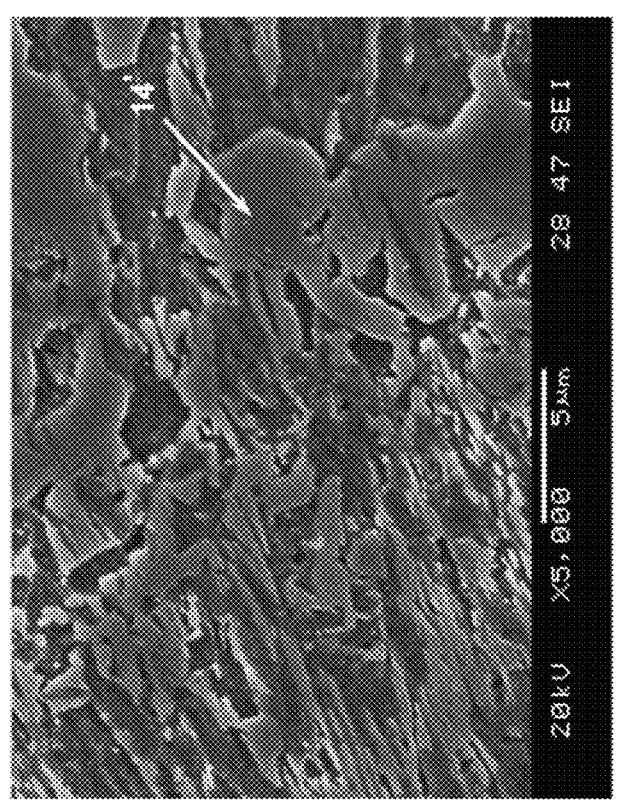
Figure 12B:
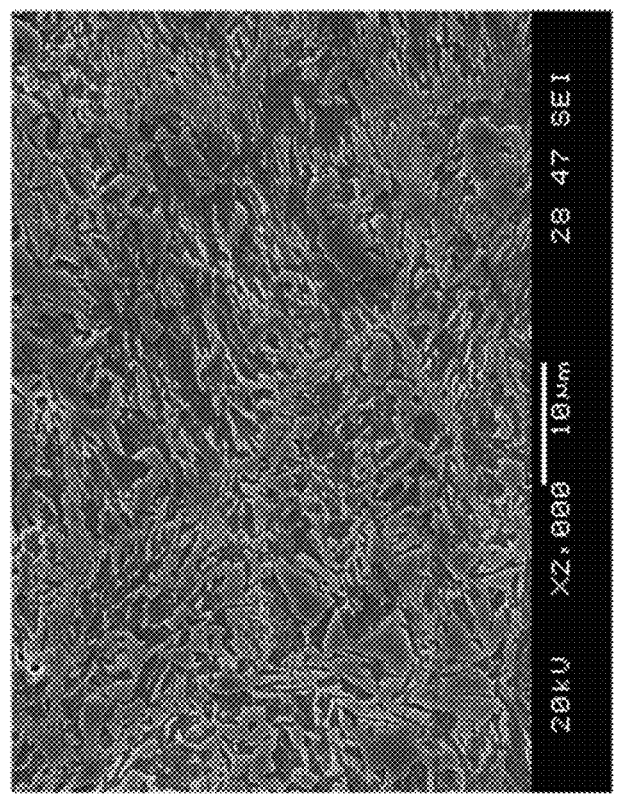

FIGS. 12A-12C are macro/micrographs of a weld of 0.35C-0.6Mn-0.5Si using prior art method 2. FIG. 12A is a macrograph of the weld showing no visible macroscopic cracks in weld nugget. FIG. 12B is a micrograph of the weld nugget at 2,000× magnification showing no visible microcracks. FIG. 12C is a micrograph of the weld nugget at 5,000× magnification showing martensite which has "reformed" (after having been converted to austenite) 14'.

Figure 13A:
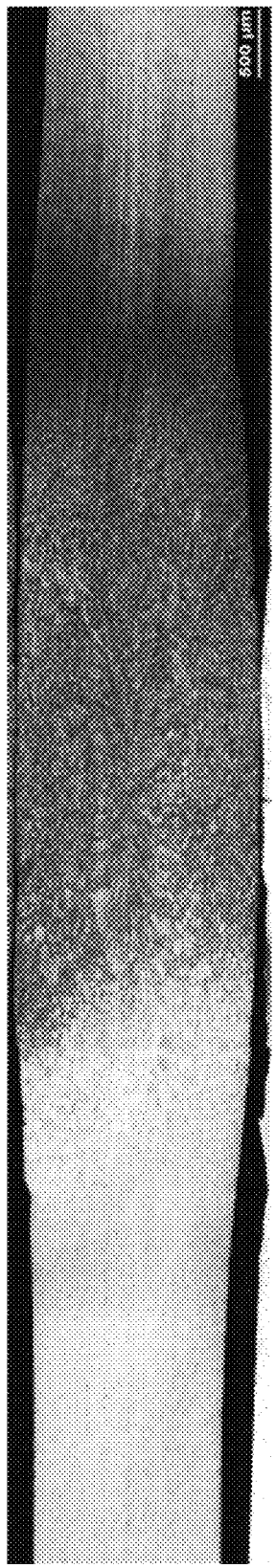
FIGS. 13A-13C are macro/micrographs of a weld of 0.35C-0.6Mn-0.5Si using prior art method 3.
Figure 13C:
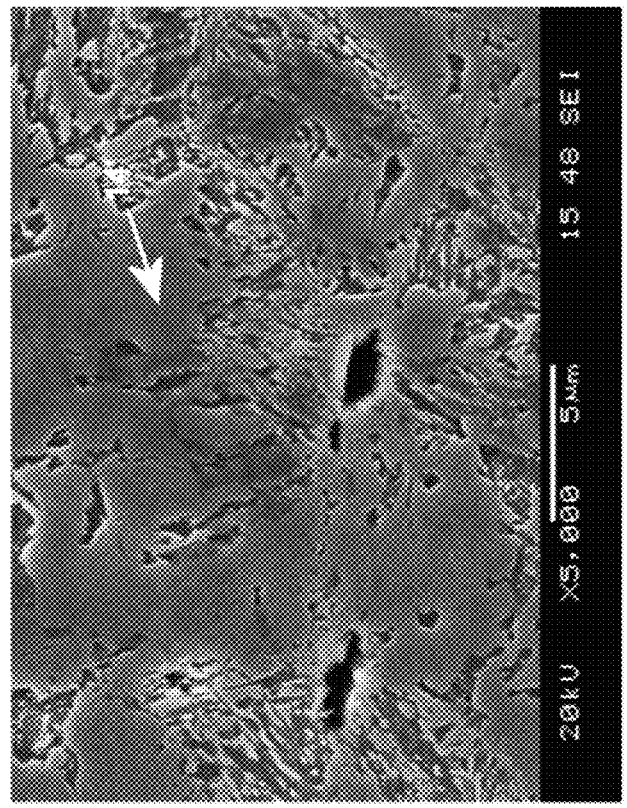
Figure 13B:
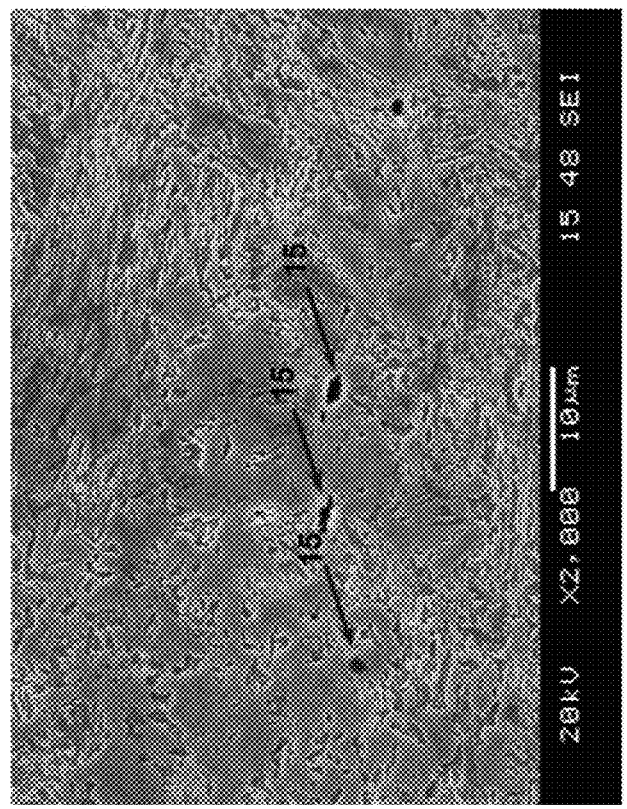

FIGS. 13A-13C are macro/micrographs of a weld of 0.35C-0.6Mn-0.5Si using prior art method 3. FIG. 13A is a macrograph of the weld showing no visible macroscopic cracks in weld nugget. FIG. 13B is a micrograph of the weld nugget at 2,000× magnification showing microcracks 15. FIG. 13C is a micrograph of the weld nugget at 5,000× magnification showing re-formed martensite 14'.

Figure 14A:
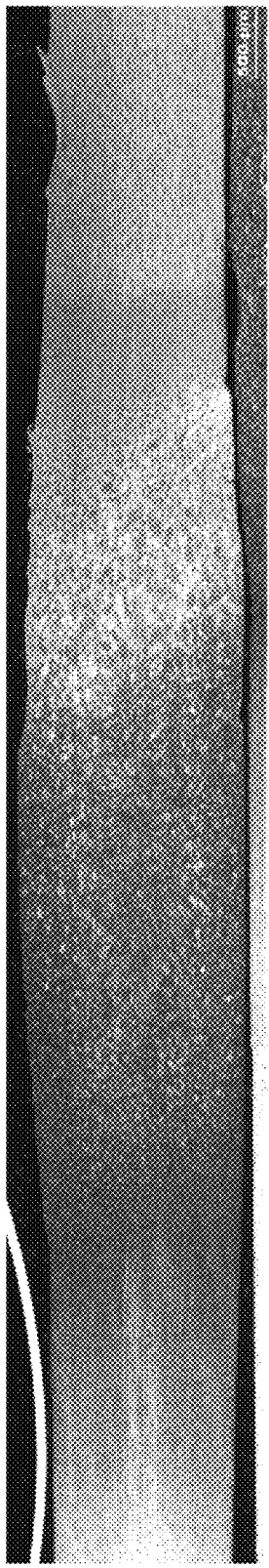
FIGS. 14A-14C are macro/micrographs of a weld of 0.35C-0.6Mn-0.5Si using inventive method 4.
Figure 14C:
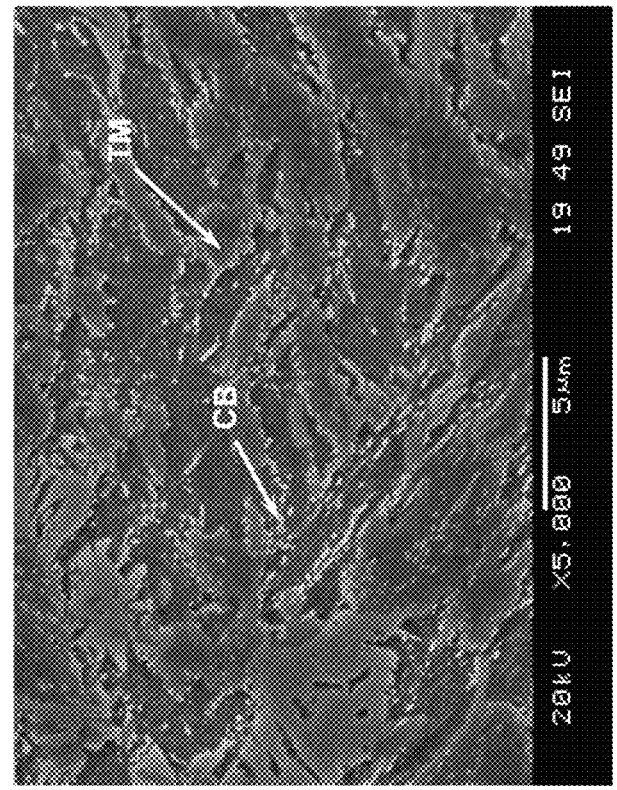
Figure 14B:
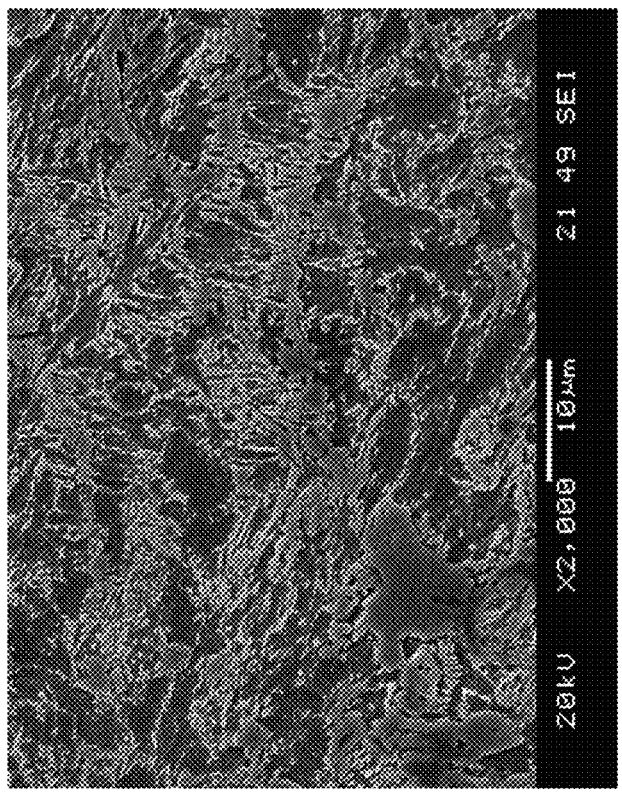

FIGS. 14A-14C are macro/micrographs of a weld of 0.35C-0.6Mn-0.5Si using inventive method 4. FIG. 14A is a macrograph of the weld showing no visible macroscopic cracks in weld nugget. FIG. 14B is a micrograph of the weld nugget at 2,000× magnification showing no visible microcracks. FIG. 14C is a micrograph of the weld nugget at 5,000× magnification showing carbide (CB) formation and tempered martensite TM.

Figure 15:
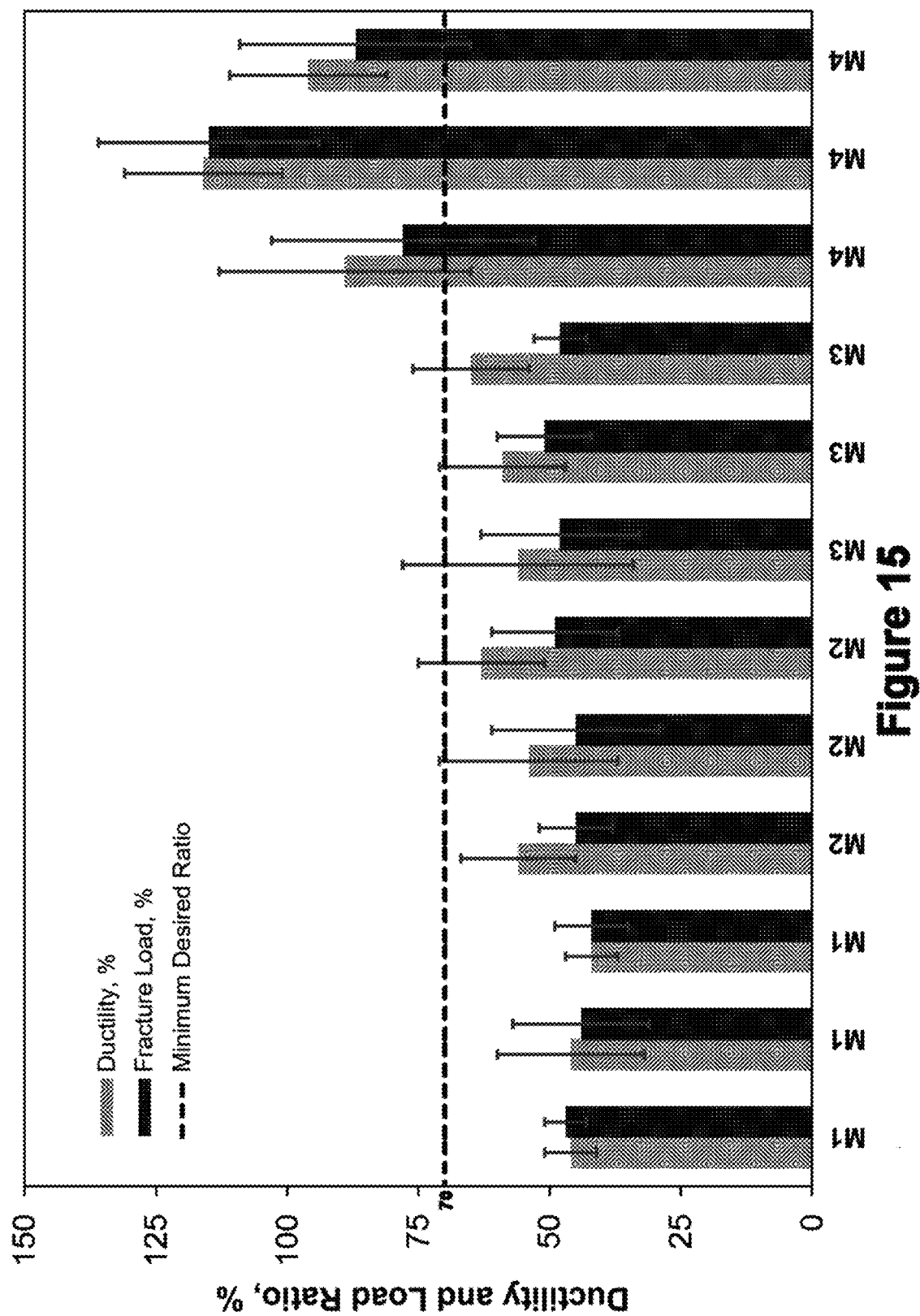
FIG. 15 plots the Olsen Cup test results of 0.35C-0.6Mn-0.5Si welded using the four different methods.

After the welds were formed, each of the welds were subjected to Olsen Cup testing to determine if the weld is of high enough quality to allow the weld to pass through a continuous processing line. FIG. 15 shows the Olsen Cup test results of 0.35C-0.6Mn-0.5Si welded using the four different methods (M1, M2, M3, and M4). Specifically FIG. 15 plots the load and ductility ratios as defined above for 3 examples each of M1-M4. The load and ductility ratios must be greater than 70% to consider the weld quality to be sound enough to allow the weld to pass through the continuous annealing line without damage. As can be seen from FIG. 15, welds by methods 1, 2 and 3 failed to meet the minimum requirement of desired weld quality. Samples that were welded using inventive welding method (M4) demonstrated ~100% ductility ratio (ratio of weld to base metal (BM) displacement) and ~100% load ratio (ratio of weld to BM fracture load), which are well above than minimum desired value (70%) for desired quality.

FIGS. 16A-16D are macrographs of the weld nugget after testing for methods 1-4 respectively. FIG. 16A shows that the weld nugget produced by prior art method 1 developed a macroscopic crack 12' that propagated through the weld nugget. This weld is not of the desired quality and would fail when passing through a continuous processing line. FIG. 16B shows that the weld nugget produced by prior art method 2 developed a macroscopic crack 12' that propagated through the weld nugget. This weld is also not of the desired quality and would fail when passing through a continuous processing line. FIG. 16C shows that the weld nugget produced by prior art method 3 developed a macroscopic crack 12' that propagated through the weld nugget. Again, this weld is not of the desired quality and would fail when passing through a continuous processing line. Finally, FIG. 16D shows that the weld nugget produced by inventive method 4. A macroscopic crack 12" was formed, but it did not propagate through the weld nugget. This weld attains the desired quality and would not fail when passing through a continuous processing line.

What is claimed is:

1. A welding method comprising the steps of:
    providing a first surface of a first ferrous alloy having a first composition having a Ceq of at least 0.45;
    providing a second surface of a second ferrous alloy having a second composition having a Ceq of at least 0.45;
    creating an overlap by overlapping the first surface and the second surface;
    welding the first surface to the second surface by heating the first surface and the second surface at a sufficiently high enough temperature to raise temperatures of the first surface and the second surface to at least the melting points of the first and second alloys to form a weld;
    cooling the weld to a temperature $Ti_1$ between the Ac3 and Mf temperatures of the first and second alloys;
    heating the weld to heat the weld at a rate of at least 10 C/sec to a temperature $T_1$ which is above $Ti_1$ and which is between the Ms and Ac1 temperatures of the first and second alloys;
    cooling the weld to below the Mf temperatures of the alloys;
    heating the weld at a rate of at least 10 C/sec to a temperature between the Ms and Ac1 temperatures of the first and second alloys;
    cooling the weld to room temperature;
    wherein Ceq is defined as:

$$Ceq = C + A(C)*[Si/24 + Mn/6 + Cu/15 + Ni/20 + (Cr + Mo + Nb + V)/5 + 5B]; \text{ and}$$

$A(C) = 0.75 + 0.25 \tan h[20(C-0.12)]$, the composition of each of the elements C, Si, Mn, Cu, Ni, Cr, Mo, Nb, V, and B being in wt. percent.

2. The method as recited in claim 1 wherein at least one of the first and second compositions has a Ceq of at least 0.5.

3. The method as recited in claim 1 wherein the first surface is a first end of a first steel coil and the second surface is a second end of a second steel coil.

4. The method as recited in claim 3 wherein the step of welding the first surface to the second surface includes electrical resistance seam welding.

5. The method as recited in claim 4 wherein the electrical resistance seam welding is performed using a mid-frequency direct current seam welder.

6. The method as recited in claim 5 wherein the mid-frequency direct current seam welder includes weld wheels and a post weld induction heater.

7. The method as recited in claim 6 wherein the seam welder forms the weld using two passes of the welder across the overlap.

8. The method as recited in claim 7 wherein a first of the two passes includes:
    seam welding via the weld wheels; and
    immediately annealing the seam weld via the post weld induction heater.

9. The method as recited in claim 8 wherein a second of the two passes includes:
    disengaging the weld wheels; and
    further annealing the weld via the post weld induction heater.

10. The method as recited in claim 1 wherein the weld has load and ductility ratios of at least 70%.

11. The method of claim 1, wherein the temperature $Ti_1$ is between a highest Ms temperature of the first and second alloys and a lowest Mf temperature of the first and second alloys.

12. The method of claim 1, wherein the first and second ferrous alloys are AHSS grade steel.

* * * * *